United States Patent
Weinand

[15] 3,661,400
[45] May 9, 1972

[54] HYDRODYNAMIC SEAL WITH LEAKAGE CONTROL RIB

[72] Inventor: Louis H. Weinand, Warren, Mich.

[73] Assignee: General Motors Corporation, Detroit, Mich.

[22] Filed: Oct. 8, 1970

[21] Appl. No.: 79,007

[52] U.S. Cl. .................................................. 277/134
[51] Int. Cl. ................................... F16j 15/32, F16j 15/48
[58] Field of Search ........................... 277/1, 178, 199, 134

[56] References Cited

UNITED STATES PATENTS

| 3,347,554 | 10/1967 | Jagger et al. | 277/134 |
| 3,504,918 | 4/1970 | Halliday | 277/134 |
| 3,534,969 | 10/1970 | Weinand | 277/1 |

*Primary Examiner*—Robert I. Smith
*Attorney*—J. L. Carpenter, E. J. Biskup and Peter D. Sachtjen

[57] ABSTRACT

A hydrodynamic seal for rotating shaft is provided with a supplemental leakage control rib inclined opposite to the hydrodynamic ribs for returning leaking fluid by gravitational, adhesion, and surface tension forces to the sealing interface and the pumping influence of the ribs.

4 Claims, 5 Drawing Figures

PATENTED MAY 9 1972 3,661,400

INVENTOR.
Louis H. Weinand
BY
Peter D. Sachtjen
ATTORNEY

HYDRODYNAMIC SEAL WITH LEAKAGE CONTROL RIB

The present invention relates to fluid seals and, in particular, to a split hydrodynamic seal incorporating fluid conveying means for returning leaking fluid to the pumping influence of the hydrodynamic elements.

Recently, hydrodynamic seals of the type disclosed in my U.S. Pat. No. 3,534,969 have been commercially accepted as an effective means for affirmatively preventing fluid leakage under static and dynamic operating conditions. These seals are generally of the radial lip type and have their sealing capabilities greatly improved by the use of helical ribs or grooves placed on the air side surface of the seal lip. The helical elements generate a positive pumping force to maintain a supply of fluid beneath the seal lip thereby containing fluid leakage and, at the same time, continuously lubricating the sealing interface to substantially eliminate seal lip wear. Although this method has proved to be highly successful as a sealing mechanism, one limiting characteristic is present under certain environmental conditions. More particularly, inasmuch as the hydrodynamic elements are commonly helically inclined in a direction of predominant shaft rotation, leakage occurring in the region at the horizontal center line of the sealing element can be conveyed away from the pumping influence of the hydrodynamic elements by gravitational forces, as would occur if the fluid flow is greater than the hydrodynamic pumping capacity. The leaking fluid follows the channel between the elements until displaced irrevocably beyond the fluid pumping forces. While this type of leakage is present to some extent in all radial seals, split seals of the type commonly used to seal the rear end of the crankshaft in an internal combustion engine pose a particularly difficult problem. Conventionally, these seals are formed with at least one split along their horizontal center line and, because of attendant manufacturing defects, are accordingly more prone to leakage in the aforementioned region.

The above problem is solved in the present invention by providing a supplemental leakage control rib which functions to return the leaking fluid by gravitational, adhesion, and surface tension forces to the pumping influence of the hydrodynamic elements. The control rib is formed on the lower half of the seal and extends from a point outwardly of the seal lip at the horizontal center line circumferentially downwardly to a termination point below and to the other side of the vertical center line of the seal in the vicinity of the sealing interface. The rib converges radially inwardly toward the seal lip to form a generally V-shaped trough which intersects the hydrodynamic ribs over a sector extending from approximately the 3 o'clock position or the horizontal center line to the 6 o'clock position or the vertical center line. In this manner, any fluid leakage within this sector is channeled between the hydrodynamic ribs until contacting the fluid control rib at which time the fluid is directed downwardly by gravity, adhesion, and surface tension forces until acted upon by the hydrodynamic forces generated by the ribs. By this supplemental leakage control, a considerably greater control over fluid leakage is provided despite manufacturing defects of the type listed above.

Accordingly, an object of the present invention is to provide a split fluid seal having means for conveying leaking fluid to the sealing interface by means of gravitational forces.

Another object of the present invention is to provide a hydrodynamic seal having a fluid control rib which circumferentially intersects the hydrodynamic elements and gravitationally redirects leaking fluid to the pumping influence of the elements.

A further object of the invention is to provide a split hydrodynamic seal of the type having a radial seal lip and a horizontal split line wherein a leakage control rib circumferentially intersects the hydrodynamic elements and extends from the split line downwardly to the seal lip at the vertical center line of the seal thereby redirecting leaking fluid by gravitational, surface tension, and adhesion forces to the sealing influence of the elements.

These and other objects will be apparent to one skilled in the art upon reading the following detailed description, reference being made to the accompanying drawings in which.

Figure 1:
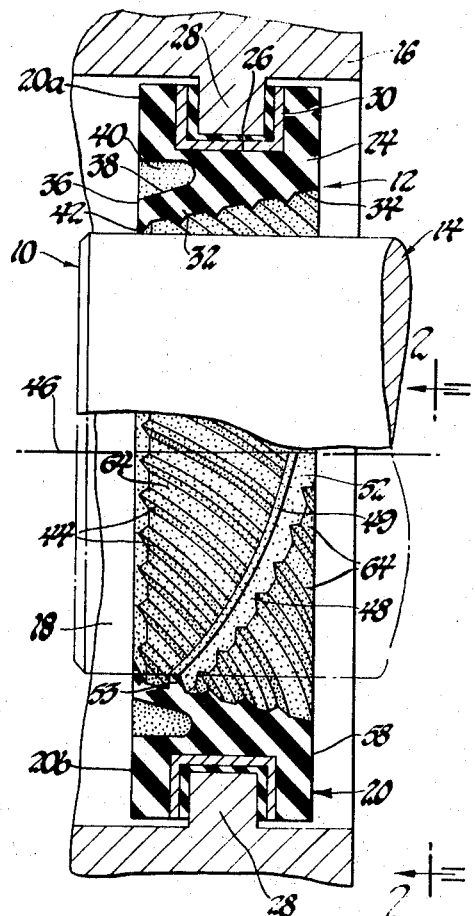
FIG. 1 is a rear crankshaft sealing installation incorporating a split hydrodynamic seal made in accordance with the present invention.

Referring to FIG. 1, there is shown a rear crankshaft seal installation 10 wherein a split hydrodynamic seal 12 made in accordance with the present invention seals the space between a rotatable crankshaft 14 and a housing 16 to thereby prevent a loss of fluid from a fluid reservoir 18.

The seal 12 is of the positive acting hydrodynamic type described in my aforementioned U.S. Pat. No. 3,534,969. The seal 12 includes a sealing annulus 20 comprised of half circular seal sections 20a and 20b which mate at a horizontal split line 22 to form a closed circular seal body. While the preferred embodiment is described with reference to the use of half annulus segments, a single split seal or an uninterrupted sealing annulus can also beneficially incorporate the present invention.

The sealing annulus 20 is formed of an elastomeric material and is provided with an outer annular body portion 24 having a circumferential U-shaped channel 26 formed therein. The side walls of the channel 26 compressively engage a radially inwardly projecting flange 28 on the housing 16 to axially locate the seal 12 in assembly. An annular U-shaped metallic insert 30 is embedded in the portion 24 parallel to the channel 26 for providing reinforcing for the sealing annulus 20. A radially inwardly facing resilient seal lip 32 is formed integrally with portion 24. The seal lip 32 is defined by a conical air side wall 34, an axially facing fluid side wall 36, and an outer conical wall 38 as defined by a U-shaped channel 40. The walls 36 and 34 intersect at a circular seal edge 42 which is adapted to engage the outer cylindrical surface of the crankshaft 14. A plurality of hydrodynamic ribs 44 are formed about the circumference of and across the conical air side wall 34 and have tips terminating at the seal edge 42. The ribs are commonly helically inclined on the wall 34 and toward the seal edge 42 in a direction corresponding to the direction of predominant rotation of the shaft 14 about its axis 46. In a well known manner, during periods of nonrelative rotation, the seal edge 42 effects a static seal to prevent a flow of fluid to the reservoir 18. Under dynamic operating conditions, the ribs 44 maintain a fluid film beneath the seal lip 32 to thereby establish a dynamic fluid interface.

Figure 2:
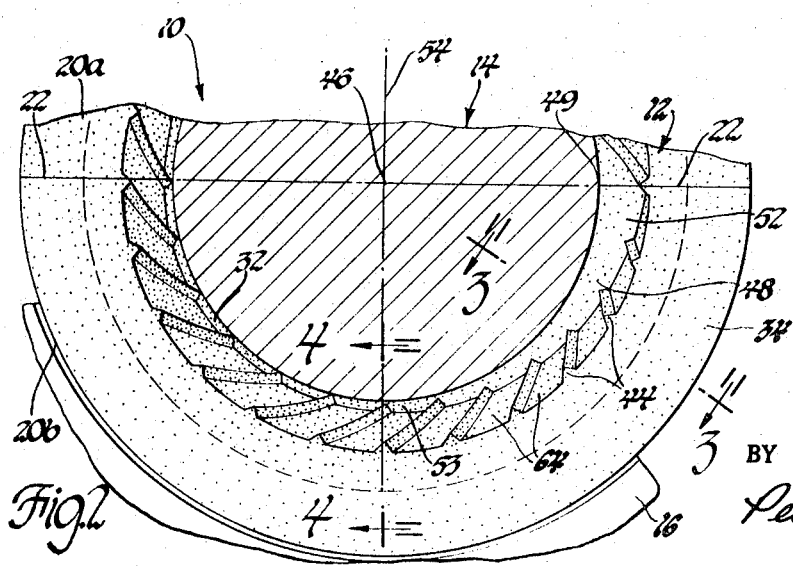
FIG. 2 is a fragmentary view taken along line 2—2 of FIG. 1.

Referring to FIG. 2, a leakage control rib 48 is formed along the wall 34 in the lower circular sealing element 20b. The control rib 48 extends circumferentially in an opposite direction to the ribs 44 and projects radially inwardly from the conical wall. In this respect, the inner right cylindrical surface 49 of the rib 48 may lightly contact or be slightly spaced from the cylindrical surface of the crankshaft 14. The control rib 48 converges toward the axis 46 and the seal edge 42 to form a generally V-shaped trough 50 with the air side wall 34. The rib 48 extends circumferentially and axially advances across the wall 34 from an entrance end 52 at the split line 22, or 3 o'clock position, downwardly to a terminal end 53 at a position beyond vertical center line 54, or a 6 o'clock position. In other words, the rib 48 extends axially from a position at the outer wall 58 of the sealing annulus 20 in the 3 o'clock position to a termination immediately adjacent the seal edge 42 at the 6 o'clock position. During this traverse, the height of the control rib 48 gradually decreases.

Figure 5:
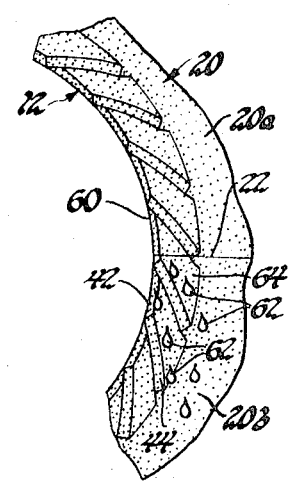
FIG. 5 is a view showing fluid leakage between the hydrodynamic ribs.

Referring to FIG. 5, in conventional hydrodynamic seals where leakage occurs in a region 60 ranging around the 3 o'clock position, drops of fluid 62 migrate downwardly due to gravitational forces in the channels 64 between the ribs 44. Once these drops pass beyond the pumping influence of the ribs 44, they constitute, of course, irrevocable leakage. The problem of leakage in this area is more pronounced in hydrodynamic fluid seals of the split construction design. These seals are subject to manufacturing irregularities which can cause cracks at the split line 22 due to molding defects, mismatching between the seals, surface voids, and the like. In applications such as the rear crankshaft, any loss of fluid is undesirable.

Figure 3:
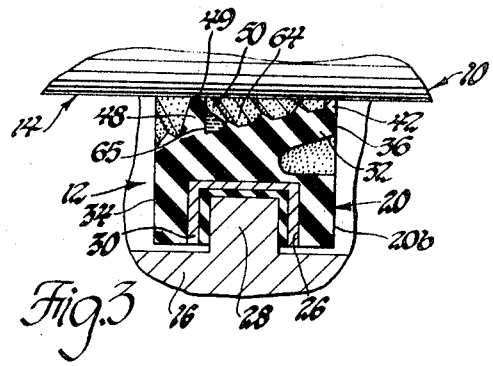
FIG. 3 is a view taken along line 3—3 of FIG. 2.
Figure 4:
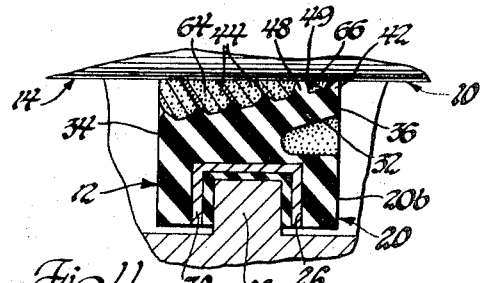
FIG. 4 is a view taken along line 4—4 of FIG. 2.

With the above described fluid control rib 48, however, fluid leaking beyond the pumping influence of the ribs 44, as shown in FIG. 3, will flow downwardly in the channels 64 and collect as at 65 in the groove 50 between the intersecting surfaces of the conical air side wall 34 and the leakage control rib 48. This fluid is then directed circumferentially downwardly by gravitational, adhesion, and surface tension forces until, as shown in FIG. 4, the fluid 66 is returned to the pumping influence of the ribs 44 at which time it is returned to the dynamic operating mode of the fluid seal. Leakage at the horizontally opposite split line, or 9 o'clock position, does not require similar control inasmuch as the inclination of the ribs and the gravitational forces coact to displace leaking fluid toward the interface.

The leakage control rib in a fluid seal of the above-mentioned type generally should span at least a 90° sector from the 3 o'clock to the 6 o'clock position to insure complete collection and redirection of the leaking fluid. However, a narrower sector might be acceptable if leakage is restricted to a particular location. To insure a positive flow of fluid toward the seal lip, the control rib 48 should intersect the axis 46 at an acute angle of around 70° with the conical angle of the wall 34 being approximately 20°. Additionally, to insure that the fluid which adheres to the surface of the shaft 14 will not be drained from the seal installation, the ribs should maintain operative wiping contact with the shaft which may be either slight interference or small clearance in the range of a few thousandths. If the aforementioned problem is not deemed significant, however, the control rib need only project slightly beyond the innermost portion of the ribs 44 so as to form a positive feeding trough between the fluid inception point and the fluid discharge point.

Although only one form of this invention has been shown and described, other forms will be readily apparent to those skilled in the art. Therefore, it is not intended to limit the scope of this invention by the embodiment selected for the purpose of this disclosure, but only by the claims which follow.

What is claimed is:

1. A fluid seal, comprising: a sealing member having a resilient seal lip for engaging a rotating member to establish a sealing interface and prevent the flow of fluid from a reservoir; a conical wall on said sealing member spaced from the reservoir by said seal lip; helically disposed hydrodynamic means on the conical wall effective to transfer leaking fluid to said interface; and a fluid conveying element formed on said conical wall and inclined opposite said hydrodynamic means for returning leaking fluid by gravitational forces to the pumping influence of the hydrodynamic means.

2. A hydrodynamic seal for sealing a relatively rotating shaft to prevent the flow of fluid from a reservoir, comprising: a sealing annulus; a pair of walls converging at a radially inwardly facing seal lip engageable with the shaft, one of said walls being conical and diverging outwardly from the seal lip and the reservoir; a plurality of hydrodynamic elements helically formed in one direction on said one of said walls for returning leaking fluid toward said seal lip; and a leakage control rib formed on said wall and circumferentially extending from the horizontal center line of the annulus in a direction opposite said elements to beyond the vertical center line and converging radially and axially toward said seal lip so as to be effective to return leaking fluid by gravitational forces to the pumping influence of said hydrodynamic elements.

3. A split fluid seal for sealing a relatively rotating shaft to prevent the flow of fluid from a reservoir, comprising: an annular seal member having a pair of sections mating at a horizontal split line to form a closed annular surface, said sections including one conical wall converging at a radially inwardly facing seal lip engageable with the shaft, the seal lip being susceptible to fluid leakage beyond the seal lip in the vicinity of the split line; and a leakage control rib formed on said conical wall and circumferentially and axially extending from the split line of the sealing annulus to beyond the vertical center line in a direction opposite the direction of shaft rotation, said rib radially converging toward the seal lip to establish a circumferential trough which is effective to return leaking fluid by gravitational, adhesion, and surface tension forces to the sealing influence of said seal lip.

4. A split hydrodynamic fluid seal for sealing a relatively rotating crankshaft to prevent the flow of fluid from a reservoir, comprising: a pair of semicircular elastomeric seal halves interfitting at a horizontal split line to form a closed sealing annulus; a pair of walls including one conical wall converging at a radially inwardly facing seal lip engageable with the crankshaft, said conical wall diverging outwardly from said seal lip, the crankshaft, and the reservoir; a plurality of hydrodynamic elements helically inclined in one direction on said conical wall operative to return leaking fluid toward said seal lip; and a leakage control rib formed on said conical wall and circumferentially extending from one horizontal split line in a direction opposite said ribs to beyond the vertical center line of the lower seal half and radially axially converging toward said seal lip so as to return leaking fluid by gravitational, adhesion, and surface tension forces to the pumping influence of said hydrodynamic elements.

* * * * *